United States Patent
Von Bueren et al.

(10) Patent No.: US 12,484,884 B2
(45) Date of Patent: Dec. 2, 2025

(54) TISSUE CASSETTE READER

(71) Applicant: Sakura Finetek U.S.A., Inc., Torrance, CA (US)

(72) Inventors: Erico Von Bueren, Rolling Hills Estates, CA (US); Joshua Greenlee, Torrance, CA (US)

(73) Assignee: SAKURA FINETEK U.S.A., INC., Torrance, CA (US)

( * ) Notice: Subject to any disclaimer, the term of this patent is extended or adjusted under 35 U.S.C. 154(b) by 878 days.

(21) Appl. No.: 16/154,634

(22) Filed: Oct. 8, 2018

(65) Prior Publication Data

US 2019/0105021 A1    Apr. 11, 2019

Related U.S. Application Data

(60) Provisional application No. 62/570,077, filed on Oct. 9, 2017.

(51) Int. Cl.
*A61B 10/00* (2006.01)
*A61B 90/90* (2016.01)
(Continued)

(52) U.S. Cl.
CPC .......... *A61B 10/0096* (2013.01); *A61B 90/90* (2016.02); *A61B 90/92* (2016.02);
(Continued)

(58) Field of Classification Search
CPC ..... A61B 10/0096; A61B 90/90; A61B 90/92; G01N 1/31; G01N 1/36; G01N 35/00732; G01N 35/00871
See application file for complete search history.

(56) References Cited

U.S. PATENT DOCUMENTS 7,133,543 B2   11/2006 Verwoerd et al.
7,457,481 B2   11/2008 De La Torre-Bueno et al.
(Continued)

FOREIGN PATENT DOCUMENTS

AU   2018348080 B2   11/2020
EP      3200118 A1    8/2017
(Continued)

OTHER PUBLICATIONS

Paul Williams, Leica Biosystems CEREBRO automated sample tracking, 2015, The Pathologist (Year: 2015).*
(Continued)

*Primary Examiner* — Elizabeth A Robinson
*Assistant Examiner* — Tingchen Shi
(74) *Attorney, Agent, or Firm* — William Thomas Babbitt

(57) ABSTRACT

An apparatus and system including an apparatus to identify an identifier on a tissue cassette in an assembly of a plurality of tissue cassettes including a light source operable to illuminate a plurality of tissue cassettes; a sensor operable to automatically capture an identifier on an individual tissue cassette or an image of the plurality of tissue cassettes in the assembly; and where the sensor is operable to capture reflected light from the light source of an image of the plurality of tissue cassettes, a converter to convert image data into an electronic signal. The system may include a processor operable to compare an identifier with a tissue processing protocol. A method including sensing identifiers on tissue cassettes each containing a tissue sample in an assembly comprising a plurality of tissue cassettes; and determining or verifying a tissue processing protocol of a tissue sample based on the sensed identifier.

14 Claims, 4 Drawing Sheets

(51) Int. Cl.
*A61B 90/92* (2016.01)
*A61B 90/96* (2016.01)
*G01N 1/31* (2006.01)
*G01N 1/36* (2006.01)
*G01N 35/00* (2006.01)
*G01N 1/00* (2006.01)

(52) U.S. Cl.
CPC .............. *A61B 90/96* (2016.02); *G01N 1/31* (2013.01); *G01N 1/36* (2013.01); *G01N 35/00732* (2013.01); *G01N 35/00871* (2013.01); *G01N 2001/005* (2013.01); *G01N 2001/315* (2013.01); *G01N 2035/00752* (2013.01); *G01N 2035/00801* (2013.01); *G01N 2035/00831* (2013.01)

(56) References Cited

U.S. PATENT DOCUMENTS

| | | |
|---|---|---|
| 7,793,842 B2 | 9/2010 | Neeper et al. |
| 7,876,442 B2 | 1/2011 | Graupner et al. |
| 8,283,176 B2 | 10/2012 | Bland et al. |
| 8,315,445 B2 | 11/2012 | Sorenson et al. |
| 8,341,528 B2 | 12/2012 | Chaudhary et al. |
| 8,469,275 B2 | 6/2013 | Dahari |
| 8,676,509 B2 | 3/2014 | De La Torre-Bueno |
| 8,722,412 B2 | 5/2014 | Egle et al. |
| 8,797,396 B2 | 8/2014 | Dietz et al. |
| 8,969,087 B2 | 3/2015 | Bland et al. |
| 8,973,293 B2 | 3/2015 | Palmer et al. |
| 9,117,024 B2 | 8/2015 | De La Torre-Bueno |
| 9,122,905 B2 | 9/2015 | Soenksen et al. |
| 9,285,380 B2 | 3/2016 | Kasai et al. |
| 9,322,767 B2 | 4/2016 | Ehrenkranz |
| 9,384,192 B2 | 7/2016 | Wrenn et al. |
| 9,519,847 B2 | 12/2016 | Pedrazzini |
| 9,659,153 B2 | 5/2017 | De La Torre-Bueno |
| 9,747,326 B2 | 8/2017 | Tanba et al. |
| 9,787,815 B2 | 10/2017 | Erickson et al. |
| 9,864,888 B2 | 1/2018 | Hughes |
| 10,088,655 B2 | 10/2018 | Virk et al. |
| 10,498,936 B2 | 12/2019 | Ehrenkranz |
| 10,706,247 B1 | 7/2020 | Miller |
| 10,734,099 B2 | 8/2020 | Evans et al. |
| 11,054,431 B2 | 7/2021 | Merlo et al. |
| 11,071,978 B2 | 7/2021 | Crum et al. |
| 11,231,348 B2 | 1/2022 | Msinoni et al. |
| 11,275,914 B2 | 3/2022 | Hagen et al. |
| 2003/0141443 A1* | 7/2003 | Spears ............... H04N 1/1915 250/234 |
| 2006/0159325 A1 | 7/2006 | Zeineh et al. |
| 2008/0113440 A1 | 5/2008 | Gurney et al. |
| 2010/0086964 A1 | 4/2010 | Walter et al. |
| 2010/0167334 A1 | 7/2010 | Williamson, IV |
| 2013/0065797 A1* | 3/2013 | Silbert ..................... G01N 1/31 73/304 C |
| 2014/0068442 A1 | 3/2014 | Eichhorn et al. |
| 2014/0098252 A1* | 4/2014 | Chang ............. G01N 35/00732 348/207.99 |
| 2014/0188545 A1 | 7/2014 | Chirica et al. |
| 2014/0273084 A1 | 9/2014 | Ralf et al. |
| 2014/0273085 A1* | 9/2014 | Eckert ..................... G01N 1/36 435/40.52 |
| 2014/0291400 A1 | 10/2014 | Olmstead et al. |
| 2015/0099306 A1 | 4/2015 | Ku |
| 2016/0085913 A1* | 3/2016 | Evans ................... G16H 30/00 705/3 |
| 2016/0187236 A1 | 6/2016 | Berberich et al. |
| 2016/0188937 A1 | 6/2016 | Tyrrell et al. |
| 2016/0210486 A1 | 7/2016 | Porreca et al. |
| 2016/0232391 A1 | 8/2016 | Wilhelm |
| 2017/0177913 A1* | 6/2017 | Benedetti ........... G06K 7/10366 |
| 2017/0293719 A1* | 10/2017 | Roig Munill ........ G06K 7/1417 |
| 2018/0226138 A1 | 8/2018 | Leavitt et al. |
| 2019/0105021 A1 | 4/2019 | Von Bueren et al. |
| 2020/0287416 A1 | 9/2020 | Sauterel et al. |
| 2020/0341019 A1 | 10/2020 | Cinti |
| 2020/0365241 A1 | 11/2020 | Evans et al. |
| 2021/0136722 A1 | 5/2021 | Scialò et al. |
| 2021/0140857 A1 | 5/2021 | Tarbet et al. |
| 2021/0192265 A1 | 6/2021 | Fleischmann |
| 2021/0390275 A1 | 12/2021 | Xie et al. |
| 2022/0001605 A1 | 1/2022 | Okamoto et al. |
| 2022/0160581 A1 | 5/2022 | Rigby |

FOREIGN PATENT DOCUMENTS

| | | | |
|---|---|---|---|
| ES | 2529514 B1 | 2/2015 | |
| JP | H10227797 A | 8/1998 | |
| JP | 2013-88116 A | 5/2013 | |
| JP | 2013088116 A | 5/2013 | |
| JP | 2020537127 A | 12/2020 | |
| JP | 2022508799 A | 1/2022 | |
| KR | 10-1777229 B1 | 11/2017 | |
| WO | WO-2014130592 A1 * | 8/2014 | ............ A61B 10/00 |
| WO | 201974941 A1 | 4/2019 | |
| WO | 2022117094 A1 | 6/2022 | |

OTHER PUBLICATIONS

Sakura Finetek U.S.A., Inc., Related Application, Australian Patent Application No. 2018348080, Examination report No. 1, Dated Aug. 5, 2020.
Sakura Finetek U.S.A., Inc., Related Application, Australian Patent Application No. 2018348080, Notice of Grant for Patent, Dated Feb. 18, 2021.
Idmag Romania, "Scandit Barcode Scanner SDK 5 2 Includes MatrixScan Premium", YouTube, (Jul. 6, 2017), URL: https://www.youtube.com/watch?v=xe0NuLFC9_0, (Jan. 18, 2019).
Sakura Finetek U.S.A., Inc., Related Application, Canadian Patent Application No. 3,077,707, Examiner's Report, Dated May 7, 2021.
Sakura Finetek U.S.A., Inc., Related Application, European Patent Application No. 18793345.2, Communication pursuant to pursuant to rules 161(1) and 162 EPC. Dated May 19, 2020.
Sakura Finetek U.S.A., Inc., Related Application, Japanese Patent Application No. 2020-519765, Notice of Refusal, Dated Mar. 31, 2021.
Int'l Search report, Patent Cooperation Treaty, PCT/US2018/055037, Jan. 25, 2019.
Idmag Romania: "Scandit Barcode Scanner SDK 5 2 Includes MatrixScan Premium", YouTube, Jul. 6, 2017, XP055544932 Retrieved from the Internet: URL:https://www.youtube.com/watch?v=xe0NuLFC9_o.
Written Opinion of the Int'l Searching Authority, PCT/US2018/055037.
Sakura Finetek U.S.A., Inc., Related Application, Canadian Patent Application No. 3077707, Notice of Allowance, Dated Dec. 23, 2021.
Sakura Finetek U.S.A., Inc., Related Application, European Patent Application No. 18793345.2, Communication pursuant to Article 94(3) EPC, Dated Apr. 19, 2022.
Idmag Romania: "Scandit Barcode Scanner SDK 5 2 Includes MatrixScan Premium", YouTube, Jul. 6, 2017 (Jul. 6, 2017), XP055544932.
Sakura Finetek U.S.A., Inc., Related Application, Chinese Patent Application No. 2018800656587, Notice of Allowance, Dated Apr. 24, 2022.
Related Application, Chinese Patent Application No. 201880065658.7, Sakura Finetek U.S.A., Inc., Second Office Action, Dated Nov. 16, 2022.
Related Application, Sakura Finetek U.S.A., Inc.; European Patent Application No. 18793345.2, Communication pursuant to Article 94(3) EPC, Dated: Feb. 15, 2023.
Idmag Romania: "Scandit Barcode Scanner SDK 5 2 Includes MarixScan Premium", YouTube, Jul. 6, 2017, XP055544932.
Related Application, Sakura Finetek U.S.A., Inc.; Chinese Patent Application No. 201880065658.7, Decision of Rejection, Dated Feb. 11, 2023.

(56) References Cited

OTHER PUBLICATIONS

Related Application, Chinese Patent Application No. 2018800656587, Sakura Finetek U.S.A., Inc., First Office Action, Dated Apr. 24, 2022.

Related Application, Brazil Patent Application No. BR112020006429-7, Sakura Finetek U.S.A., Inc., Preliminary Office Action, Dated Oct. 31, 2023.

Related Application, European Patent Application No. 18793345.2-1001, Sakura Finetek U.S.A., Inc., Communication Pursuant To Article 94(3) EPC , Dated Sep. 26, 2023.

Related Application, Chinese Patent Application No. 2018800656587, Sakura Finetek U.S.A., Inc., Decision of Rejection, Dated Feb. 11, 2023.

Related Application, European Patent Application No. 18793345.2-1001, Sakura Finetek U.S.A., Inc., Communication Pursuant To Article 94(3) EPC , Dated Oct. 23, 2024.

Idmag Romania: "Scandit Barcode Scanner SOK 5 2 Includes MatrixScan Premium", YouTube, Jul. 6, 2017 (Jul. 6, 2017), XP055544932. URL: https://www.youtube.com/watch?v=xe0NuLFC9_o, (Jan. 18, 2019).

Related Application, Brazil Patent Application No. BR112020006429-7, Examination Report, Dated Feb. 21, 2024.

Related Application, European Patent Office Application No. 18 793 345.2-1001, Communication pursuant to Article 94(3) EPC, Mailed On Oct. 1, 2025.

Related Application, U.S. Appl. No. 17/988,685, Office Action, Mailed On Oct. 25, 2025.

Related Application, European Patent Office Application No. 23175891.3-1001, Communication pursuant to Article 94(3) Epc, Mailed On Mar. 13, 2025.

Related Application, Australian patent appl. No. 2023200955, Examination Report No. 2, Dated Jun. 13, 2024.

Related Japanese patent application No. 2023-021343, Notice of reasons for refusal, Dated: Apr. 22, 2024.

Related Application, Australian patent appl. No. 2023200955, Examination Report No. 1, Dated Nov. 30, 2023.

\* cited by examiner

TISSUE CASSETTE READER

CROSS-REFERENCE TO RELATED APPLICATIONS

The present Application claims the benefit of U.S. Provisional Patent Application No. 62/570,077 entitled "Tissue Cassette Reader," filed Oct. 9, 2017, the contents of which are incorporated in this disclosure by reference in their entirety.

TECHNICAL FIELD

Tissue processing and carrier identification.

BACKGROUND

Tissues from the body taken for diagnosis of disease processes are often processed in the histology laboratory to produce paraffin blocks embedding them to then cut thin tissue sections which can be mounted on slides, stained and viewed under a microscope by a pathologist for analysis. These pre-analytical processes generally include, in order, gross examination, fixation, dehydration, clearing, paraffin infiltration and embedding. The procedure is used for processing tissues including biopsies, larger specimens removed at surgery, or tissues from autopsy.

Gross examination generally consists of describing the macroscopic specimen and placing all or selected parts of it into a sample carrier such as a small plastic cassette which holds the tissue while it is being processed to a paraffin block. Initially, the cassettes are placed into a fixative.

Following gross examination, the fixation of the tissue continues. A purpose of fixation is to preserve tissues permanently in as life-like a state as possible by altering structures of proteins such that degradation by autolysis does not occur. Once the tissue has been fixed or fixated, the tissue needs to be processed into a form in which it can be made into thin sections for microscopic examination. The usual way this is done is with paraffin. Embedding tissue in paraffin provides a solid support matrix for the tissue allowing it be sectioned at a thickness on the order of 1 to 20 microns. Getting fixed tissue into paraffin for sectioning is called tissue processing with the main steps in this process being dehydration, clearing, infiltration, which then is followed by embedding.

Tissues fixed in aqueous solutions cannot be directly infiltrated with paraffin. First, the water from the tissues must be removed by dehydration. This may be done with a series of alcohols at different concentrations (e.g., 70 percent to 95 percent to 100 percent). Alternatively, the dehydration is done with a mixture of formalin and alcohol. Other dehydrants can also be used such as acetone or mixtures of different solvents.

Following dehydration, the tissue is cleared. "Clearing" consists of removal of the dehydrant and some of the lipids with a substance that will be miscible with the embedding medium (e.g., paraffin). The most common clearing agent is xylene.

Once cleared, the tissue is infiltrated with an embedding agent such as paraffin. Finally, the tissue in a cassette or removed from its cassette is placed into molten paraffin and then the paraffin is cooled to form a solidified block embedding or encapsulating the tissue so that it can be sectioned. Alternatively, the tissue can be processed in a sectionable cassette, embedded in paraffin along with the cassette and sectioned. Once the tissue has been embedded in a solid paraffin block, the tissue can be cut into sections that can be placed on one or multiple slides. This is done with a microtome. Once sections are cut, they are floated on a warm water bath that helps remove any wrinkles. The tissue sections in paraffin are then picked up from the water bath and placed on a glass microscope slide.

A sample carrier such as a cassette may be marked with identification and/or process information. The introduction of barcodes has made it possible to machine read barcodes printed on a sample carrier and to track the sample carrier during histological sample processing, embedding, sectioning and any verifications steps from creation to archiving.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

An automated device or apparatus operable to obtain information from a sample carrier such as an identifier on a sample carrier such as a tissue cassette is disclosed. In one embodiment, the device is operable to sense identification information (an identifier) such as a barcode on a display area of a single cassette while the cassette is present with other cassettes in an assembly such as a magazine or basket. In another embodiment, the device or apparatus is operable to capture an image (e.g., a two- or three-dimensional image) of identifiers on multiple cassettes in an assembly. Each identifier whether sensed individually or captured in an image of identifiers of multiple cassettes is then read and optionally stored. The read and optionally stored information regarding an identifier may be used for quality control, routing and tracking of cassettes in a laboratory (e.g., a histopathology laboratory).

Figure 1:
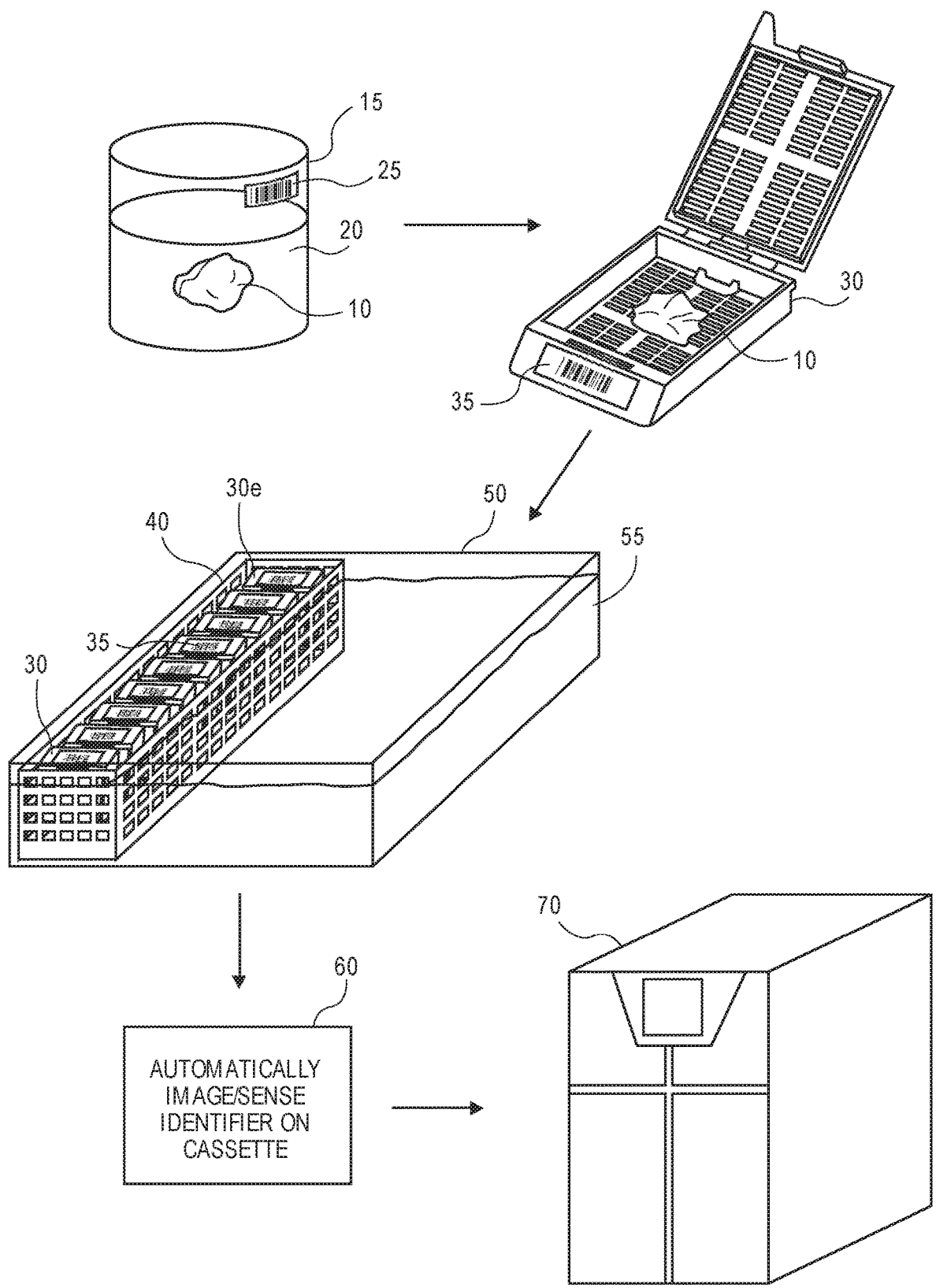
FIG. 1 shows an illustrative process flow of preparing a tissue taken from a subject for tissue processing.

FIG. 1 illustratively shows a representative process flow of a tissue sample prior to tissue processing described above (e.g., prior to dehydration, clearing, paraffin infiltration and embedding). FIG. 1 shows tissue sample 10 that has been, for example, taken from a body (e.g., a human body) and placed in container 15 and immersed in fixative 20 such as formalin. In one example, tissue sample 10 may be obtained in a medical procedure by a physician that desires the tissue sample be evaluated for diagnostic or forensic purposes (e.g., evaluated for the presence of a disease). Container 15, in this embodiment, includes identifier 25 such as barcode that representatively contains or references information such as the name of the patient from where the tissue was extracted, physician identification information and optionally the desired processing protocol.

Prior to evaluation for diagnostic or forensic purposes, tissue sample 10 is subjected to tissue processing. To prepare for tissue processing, tissue sample 10 is transferred in whole or in part from container 15 into cassette 30, such as a plastic cassette (e.g., a sectionable cassette). Cassette 30 is generally a rectangular box having an interior volume defined by sidewalls and a base and having a retractable lid. A front sidewall or face of cassette 30 may be disposed at, for example, a 45-75 degree angle relative to the base with the other sidewalls at approximately a 90 degree angle relative to the base. Identifier 35 such as a barcode that contains or references information such as patient information, physician information and optionally processing protocol for the tissue sample is affixed by a technician to the front sidewall or face of cassette 30.

Once tissue sample 10 or a portion thereof is contained in cassette 30 (with lid closed), cassette 30 is placed in magazine 40, in one embodiment, along with other cassettes that are to be subjected to a similar tissue processing protocol. Representative magazines include Tissue-Tek AutoTEC® magazines and Tissue-Tek Xpress® magazines, where Tissue-Tek AutoTEC® and Tissue-Tek Xpress® are trademarks of Sakura Finetek USA, Inc. In another embodiment, magazine 40 may be a tissue cassette basket such as a cassette basket used in a Tissue-Tek VIP® tissue processor, where Tissue-Tek VIP® is a trademark of Sakura Finetek. As illustrated in FIG. 1, each cassette is placed in magazine 40 in an upright position so that the front sidewall or face of each cassette faces out the top of the magazine as viewed.

As noted above, in an embodiment, where cassettes such as cassette 30 are placed in a magazine according to a tissue processing protocol to be performed on each tissue sample (each tissue sample will receive the same tissue processing protocol), in one embodiment a reference cassette, such as an empty cassette (cassette 30e), may be included in the magazine. Cassette 30e includes an identifier on its front sidewall or face that specifically associates the magazine (magazine 40) with a particular tissue processing protocol and/or that contains information about the particular tissue processing protocol.

Referring to FIG. 1, magazine 40 is placed into a volume of JAR 50 that includes a fixative (fixative 55) in a volume therein to inhibit tissue samples in individual cassettes from drying out. In one embodiment, magazine 40 is placed into JAR 50 prior to loading cassettes into the magazine to ensure tissue samples in cassettes do not dry out and continue to be fixed or fixated. Magazine 40 can reside in JAR 50 either alone or with other magazines. JAR 50 may include features such as tabs that direct an alignment of a magazine in the JAR. In one embodiment, JAR 50 includes sidewalls and a base that define a volume. A top surface of JAR 50 may be exposed (no lid).

According to one embodiment, once the cassettes each containing a tissue sample are contained in a magazine in JAR 50, the identifier associated with each cassette (on a front sidewall or face) is automatically sensed by a device or apparatus that is operable to identify an identifier on an individual tissue cassette (block 60, FIG. 1). The identifier on each cassette may be sensed while the cassette remains in a magazine in JAR 50. The sensing may be done individually by, for example, automatically moving a sensor over each cassette in a magazine or magazines in JAR 50 or sensed collectively by, for example, sensing (e.g., scanning, photographing) an image of multiple cassettes in a magazine (e.g., all the cassettes) or multiple magazines in JAR 50 (all the cassettes in a portion of JAR container 50 including an entire portion). Sensing identifiers associated with cassettes at this time identifies each tissue sample prior to tissue processing. Such feature offers a quality control function by providing a check that a cassette or cassettes in a magazine destined for a particular tissue processing protocol are intended for that protocol. Where a reference cassette is in a magazine including an identifier that associates the magazine with a particular tissue processing protocol (e.g., cassette 30e), such identifier information may be compared with identifier information of each of the other tissue cassettes in the particular magazine. If after the comparison, the identifiers on all the cassettes in the magazine share the same tissue processing protocol as the reference cassette, the tissue processing protocol is initiated on all the cassettes. If the identifier on one or more cassettes in the magazine does not share the same tissue processing protocol as the reference cassette, such one or more cassettes can be removed from the magazine before tissue processing. Sensing identifiers prior to tissue processing also offers a tracking function in the sense that a location of a tissue sample is known. Sensing identifiers prior to tissue processing also offers a routing function where the cassettes have been identified for a particular tissue processing protocol which may serve to alert a technician as to the protocol to perform on the cassettes. Following the sensing of an identifier for each cassette in a magazine 40, the magazine 40 may be placed in a tissue processor 70 such as Tissue-Tek VIP® tissue processor.

Figure 2:
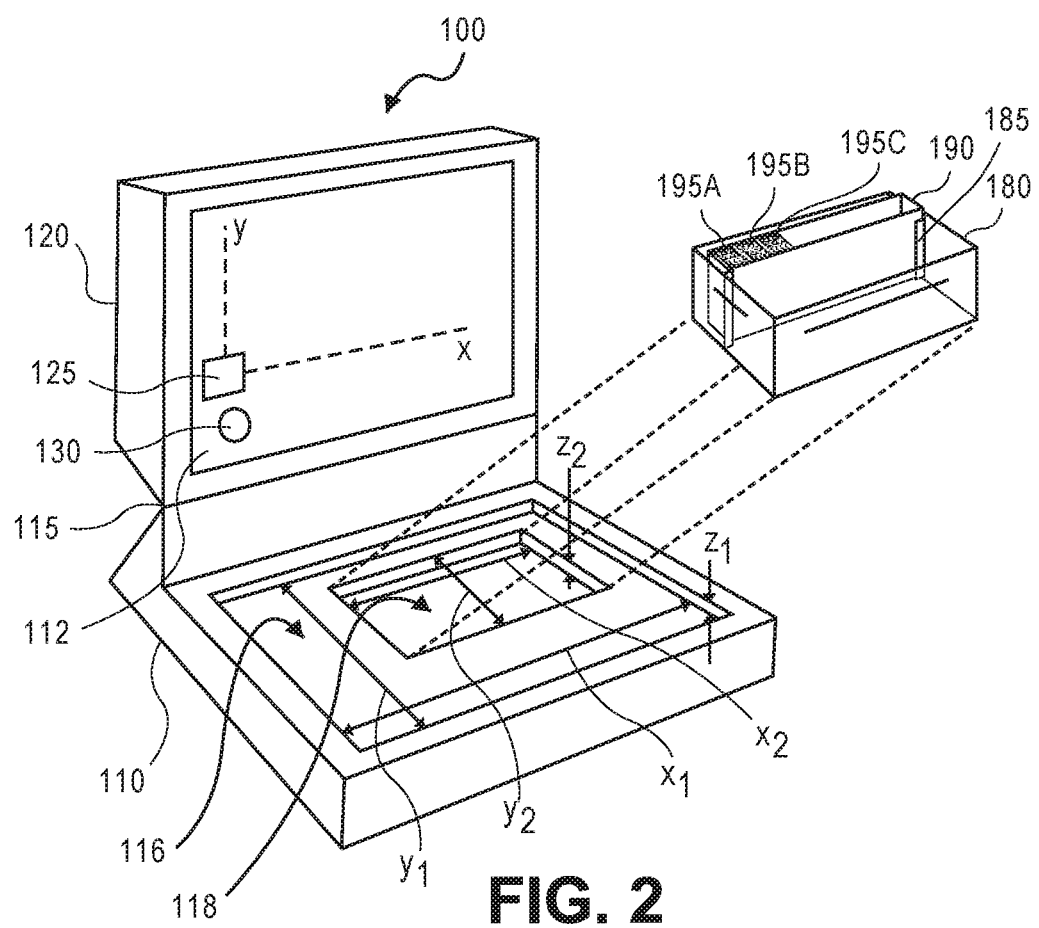
FIG. 2 shows a top, side perspective view of an embodiment of an electronic device that can sense (read), store and output identification information such as a barcode on a sample carrier.

FIG. 2 shows a top side perspective view of an embodiment of an electronic device or apparatus that can sense, read, store and output printed information such as a barcode on a sample carrier. Device 100 is operable to be mounted on a table or other surface and have sample carriers such as cassettes be brought to the device. Device 100 includes base 110 and lid or cover 120 hingedly connected to base 110 through, for example, hinge 115. In one embodiment, the electronics for a barcode reader reside in lid 120. Such electronics representatively include a light source, lens and light sensor translating optical impulses into electrical ones. In another embodiment, a barcode scanner may be based on a light source and photodiode configuration wherein a photodiode(s) measures an intensity of a light reflected back from light source from the sample carrier. In another embodiment, the electronics for a barcode reader include a charge coupled device (CCD) reader or a camera and image processing techniques to decode a barcode and/or human readable text. A camera embodiment offers a benefit of not only being useful as a barcode reader but, when information on a barcode cannot be read by the barcode reader, the camera offers a picture of the barcode and possibly other readable information. Device 100 may therefore, in another embodiment, also include or alternatively include optical character recognition (OCR) processing capability. For purposes of the following discussion, a barcode reader will be described operable to sense barcodes on cassettes. Other sample carrier identification readers such as RFID and others are also contemplated.

FIG. 2 representatively shows light source 125 and sensor 130 within a body of lid 120, optionally behind glass cover 112. In one embodiment, the light source and sensor within a body of lid 120 are connected to and controlled by a Cartesian coordinate robot or linear robot and may be moved in x- and y-dimensions, as viewed, according to machine implemented (e.g., computer implemented) software instructions associated with or transmitted to device 100.

FIG. 2 shows container 180 that has a volume that is operable to contain a number of tissue cassettes or magazines of tissue cassettes therein. In one embodiment, container 180 is a JAR container that representatively is filled with a fixative and can contain multiple magazines of cassettes (e.g., an Tissue-Tek AutoTEC® magazines and Tissue-Tek Xpress® magazines) or a tissue cassette basket such as a cassette basket used in a Tissue-Tek VIP® tissue processor. FIG. 2 representatively shows JAR container 180 including one magazine in a volume therein. Magazine 190 includes a number of cassettes (cassette 195A, cassette 195B, cassette 195C etc.). Each cassette, in one embodiment, has a barcode label printed on a front sidewall or face thereof facing outward from magazine 190 and a volume of JAR container 180 (upward as viewed). JAR container 180, in this embodiment, includes tabs 185 extending inward from opposing sidewalls that are operable to keep magazine 190 in place in the container and in a desired position and location.

Referring to FIG. 2, JAR container 180 is placed within base 110 of device 100. In one embodiment, base 110 includes one or more recesses formed therein to accommodate containers such as JAR container 180 of different sizes. The recesses are one form of orientation confiner or limiter that is intended to confine or limit the orientation of a container such as a JAR container 180 in base 110 to one orientation in which the container can be placed within base 110. Other confiners or limiters include an orientation used to locate each cassette in its carrier, and the carrier in the JAR container. In the illustrated embodiment, two different recesses are shown. Recess 116 occupies a majority of an area of base 110 and may be for a large basket or container (e.g., a JAR container) such as 150 basket JAR containers. Recess 116 is shown with x-dimension, $x_1$, and y-dimension, $y_1$ and z-dimension, $z_1$. Base 110 also includes small recess 118 within recess 116. Recess 118 may be suitable for small JAR containers such as a JAR container that may be operable to contain four magazines of e.g. twenty to thirty two cassettes each. Recess 118 is shown with x-dimension, $x_2$, y-dimension, $y_2$, and z dimension, $z_2$. Each recess serves to orient a container in base 110. In this example, the recesses are rectangular with an x-dimension greater than a respective y-dimension ($x_2 > y_2$). A container (such as JAR container 180) will have similar dimensions so that it only fits within a recess (e.g., recess 118) with its longer dimension corresponding to the x-dimension of the recess.

Figure 3:
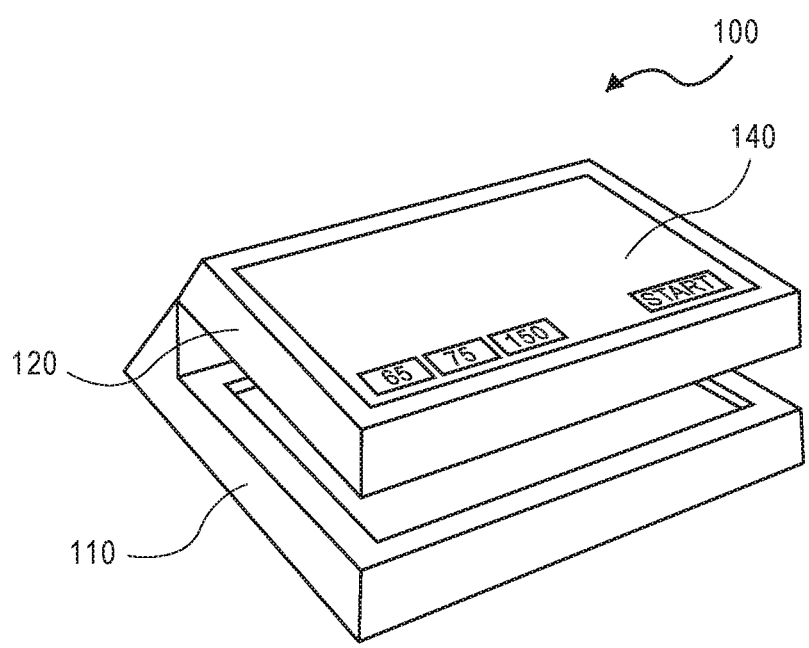
FIG. 3 shows the device of FIG. 1 where a lid of the device is rotated over a base of the device.

Once a container such as container 180 is placed in a recess in base 110 of device 100, lid 120 of the device may be rotated over an exposed surface of base 110. FIG. 3 shows the device of FIG. 1 where lid 120 is rotated over base 110. In one embodiment, an area of lid 120 is operable to cover an area of base 110 so that the sensor 130 within lid 120 can be positioned as desired over all portions of a magazine or other cassette carrier located in a container (e.g., JAR container 180) placed into a recess (recess 116 or recess 118) in base 110. FIG. 3 shows lid 120 closed over base 110. Lid 120 has a first side through which sensor 130 has access therethrough to scan cassettes in base 110 and an opposite second side. According to FIG. 3, in one embodiment, an exposed or outer second side of lid 120 includes display 140. Display 140 may provide information to a user and allow interaction between the user and the device. Display 140, in one embodiment, is a touch display. A user can operate the device by logging into device 100 (e.g., by entering individual login information) using the touchscreen display (e.g., a keypad in display 140). A user can then press a start button to start the scan of the cassettes in a JAR container.

Non-transitory program instructions within device 100 may direct a processor therein to automatically scan the recess regions of base 110 and read cassettes (scan barcodes) in magazines or baskets therein. A user may assist in the barcode scanning by instructing the device about the contents placed therein. For example, display 140 representatively includes touch pad identifiers (e.g., "65", "75", "150") that may be indicative of the container therein and for a user to press.

In one representative embodiment, device 100 has four modes of operation. A first mode of operation is that the device can scan barcodes and save them into a database within device 100. Secondly, device 100 can scan barcodes and save them into an on-board database and also send them to exterior systems such as laboratory information systems (LIS)/laboratory information management systems (LIMS)/Middleware computer software. A third mode of operation is similar to the second mode but device 100 can also request the LIS/LIMS/Middleware computer software for tissue processing protocol information or can read the tissue processing protocol out of a barcode and analyze if there is any inconsistency related to tissue processing protocols between the cassettes. Finally, a fourth mode of operation allows device 100 to scan barcodes and save them into a database associated with the device and also to identify a color of a cassette and analyze if there is any inconsistency related to tissue processing protocols defined by a color of a cassette. The results of the different operations, in one embodiment, are displayed on display 140.

In an operation, the light source and barcode reader is moved by operation of the linear robot over each cassette in a container within base 110. In one embodiment, a basket or magazines has slots for each cassette. With a container positioned within a recess in base 110 (in a single permitted configuration to orient the slots of a magazine or baskets), the linear robot is programmed to position itself over each slot where a cassette may be present. When a cassette is present, a barcode on the cassette is scanned. Referring to FIG. 2 and FIG. 3, a first side of bottom of lid 120 contains the mechanics, light source and optics to read a barcode. When lid 120 is in a closed position over base 110, the light source and sensor 130 may be moved over each magazine or basket. In another embodiment, the program instructions associated with device include manual operation allowing a user to move the barcode scanner by commands introduced through a keypad on display 140.

The imaging device and systems described allows the sensing (e.g., reading) of barcodes of individual cassettes assembled together with other cassettes without removing a cassette from other cassettes in a magazine or basket. Also, the cassette may be disposed in a liquid such as a fixative at the time of barcode reading. Other benefits include:

1) The pre-loaded configurations of the device enable loading of different types of baskets and magazines into the device.
2) PC to provide UI, process images and communication to LIS/LIMS/middleware.
3) Touchscreen for receiving information from user and provide information to user.
4) Software: module to analyze the tissue processing protocol compatibility of cassettes, module to analyze the images and read out the barcode and or text, module to store all created information into an on-board database, module to report results (cassette barcode, position in basket/magazine, date and time, etc.) on screen and in file, module to communicate with LIS/LIMS/middleware, module to set up and identify users (login), module to retrieve and collate information from cassettes stored into the database based on user queries/criteria.

5) Relatively fast barcode and fast reading camera to image the printed information on the writing surface of the cassette.
6) Barcode recognition of different types used in pathology laboratories (e.g., 2D datamatrix, 1D Code 129, Aztek).
7) True walkaway, error preventing process.
8) Automates the documentation used for tracking and tracing (e.g. into which tissue processor a cassette was loaded, for which tissue processing protocol, when, and by whom).
9) Automates tissue processing protocol verification process for cassettes.
10) Reporting of results on a device display and in file format (e.g., PDF) with the pictures of all cassette writing surfaces and location in the basket/magazine.
11) Reports can be created based on user defined queries/criteria.
12) LED illuminating the cassette without reflection for consistent image quality for all cassettes created by CCD type readers.
13) Reliable and fast automated reader of IDs of cassettes loaded into baskets or magazines before they are loaded into tissue processors.
14) Create documentation, verification and statistics on all cassettes loaded to device.
15) Minimal hands-on time (load JAR container, start process, unload JAR container).
16) Imaging device capable of reliably reading the barcode printed on an angled surface of cassettes in fixative.

Figure 4:
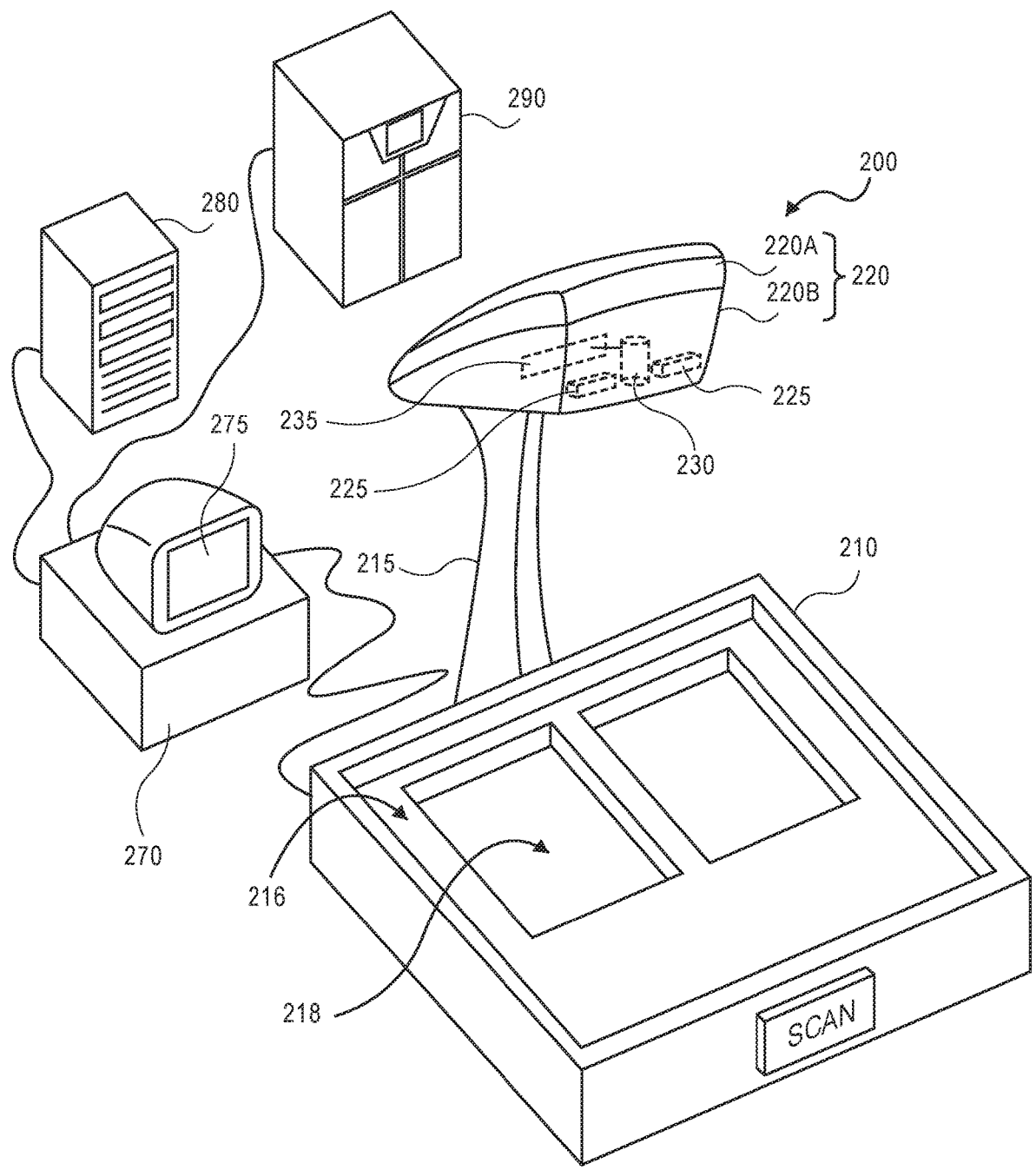
FIG. 4 shows a top, side perspective view of another embodiment of an electronic device that can sense (scan), store and output identification information such as a barcode on a sample carrier.

FIG. 4 shows a top perspective view of another embodiment of an electronic device or apparatus that can automatically sense, read, store and output printed information such as a barcode on a sample carrier. Device 200 is operable to be mounted on a table or other surface and have sample carriers such as cassettes be brought to the device. Device 200 includes 40 210 and lid or cover 220 fixedly connected to base 210 through support 215. In one embodiment, lid 220 includes fixed portion 220A and rotating portion 220B. The electronics for a barcode scanner reside in portion 220B. Such electronics representatively include light source 225 (e.g., one or more light emitting diode (LED) structures (two shown)) lens 230 and light sensor 235 such as a charge-coupled device (CCD) linear image scanner. In one embodiment, the electronics for a barcode scanner are similar to the electronics in a Fujitsu Image Scanner ScanSnap SV600 available from Fujitsu Ltd. In another embodiment, electronics for light sensor 235 is a CCD or complementary metal oxide semiconductor (CMOS) camera operable to digitally capture a three-dimensional image at a high resolution (e.g., 1600×1200 or higher). In another embodiment, electronics in device 200 include both a scanner to capture a two-dimensional image and a camera to capture a three-dimensional image.

In one embodiment, base 210 of device 200 includes one or more recesses formed therein to accommodate containers such JAR containers of different sizes similar to base 110 described above with reference to FIGS. 2 and 3. The recesses are one form of orientation confiner or limiter that is intended to confine or limit the orientation of a container such as a JAR container in base 210 to one orientation in which the container can be placed within base 210. In the illustrated embodiment, three different recesses are shown. Recess 216 occupies a majority of an area of base 210 and may be for a large basket or container. Base 210 also includes two smaller recesses 218 within recess 216. Each recess 218 may be suitable for small JAR containers such as a JAR container that may be operable to contain four magazines of e.g., 20 to 32 cassettes each. In another embodiment, base 210 provides support for the lid (through arm 215) but does not include a recess for a container or containers.

In one embodiment, device 200 shown in FIG. 4 is connected to processor 270. Processor 270 in one embodiment contains information about a tissue processing protocol for cassettes in a container. In one embodiment, device 200 is operable to scan images of identifiers (e.g., barcodes) on cassettes in a container, convert the scanned images into electronic information (signals) and provide the electronic information to processor 270. Processor 270 contains non-transitory program instructions operable to obtain the electronic information of the identifiers; to compare that information to information previously entered or retrieved from server 285 that may be, for example, a laboratory information system (LIS) about a desired tissue processing protocol; and to report and record the comparison including to report an error to a technician about a tissue sample before a tissue processing protocol is initiated. For example, processor 270, in one embodiment, includes display 275 and program instructions in the processor are operable to cause processor 270 to display a signal such as an alarm or error code on display 275. Processor 270 as a form of Middleware provides a verification process that a tissue sample in a magazine in a container is intended for a particular tissue processing protocol for other samples in the magazine or container. In another embodiment, a magazine in a container may contain a reference such as, as described above, a reference cassette with an identifier indicative of an intended tissue processing protocol. Processor 270 contains non-transitory program instructions operable to obtain the electronic information of the identifiers including an identifier on the reference (e.g., identifier on the reference cassette) and compare the electronic information of the other cassettes in the container with that of the reference to verify the tissue processing protocol of the other samples in the container. In a further embodiment, processor 270 may use information related to a color of a cassette (e.g., reference or reference cassette is color) to verify a tissue processing protocol of the tissue samples. Device 200 is operable to provide an image of an identifier on each cassette in a container (e.g., a two dimensional image). That image information captured, in one embodiment, also includes the color of the front side or face of a cassette. In a still further embodiment, processor 270 contains non-transitory program instructions operable to obtain the electronic information of the identifiers from device 200 and then inform a technician of a desired tissue processing protocol of the tissue samples in a scanned container based on the obtained information from the identifiers. Processor 270, in one embodiment, retrieves tissue processing information from server 285 and informs a technician of the tissue processing information (such as through display 275) following the scanning of identifiers on cassettes in container.

In a still further embodiment, a tissue processor is programmed to execute a tissue processing protocol based on the scanned identifiers in a particular magazine or a reference cassette or color of cassettes in a particular magazine. In one embodiment, processor 270 is connected to tissue processor 290 to effect the programming of tissue processor 290. In a still further embodiment, a technician can scan a reference cassette and the selected processing protocol of a tissue processor to confirm a match prior to executing the protocol.

In one embodiment, display 275 allows interaction between a user (e.g., a technician) and device 200. Such interaction includes, but is not limited to, initiating a scanning of a container on base 210 or a repeat of a scanning of a container.

Figure 5:
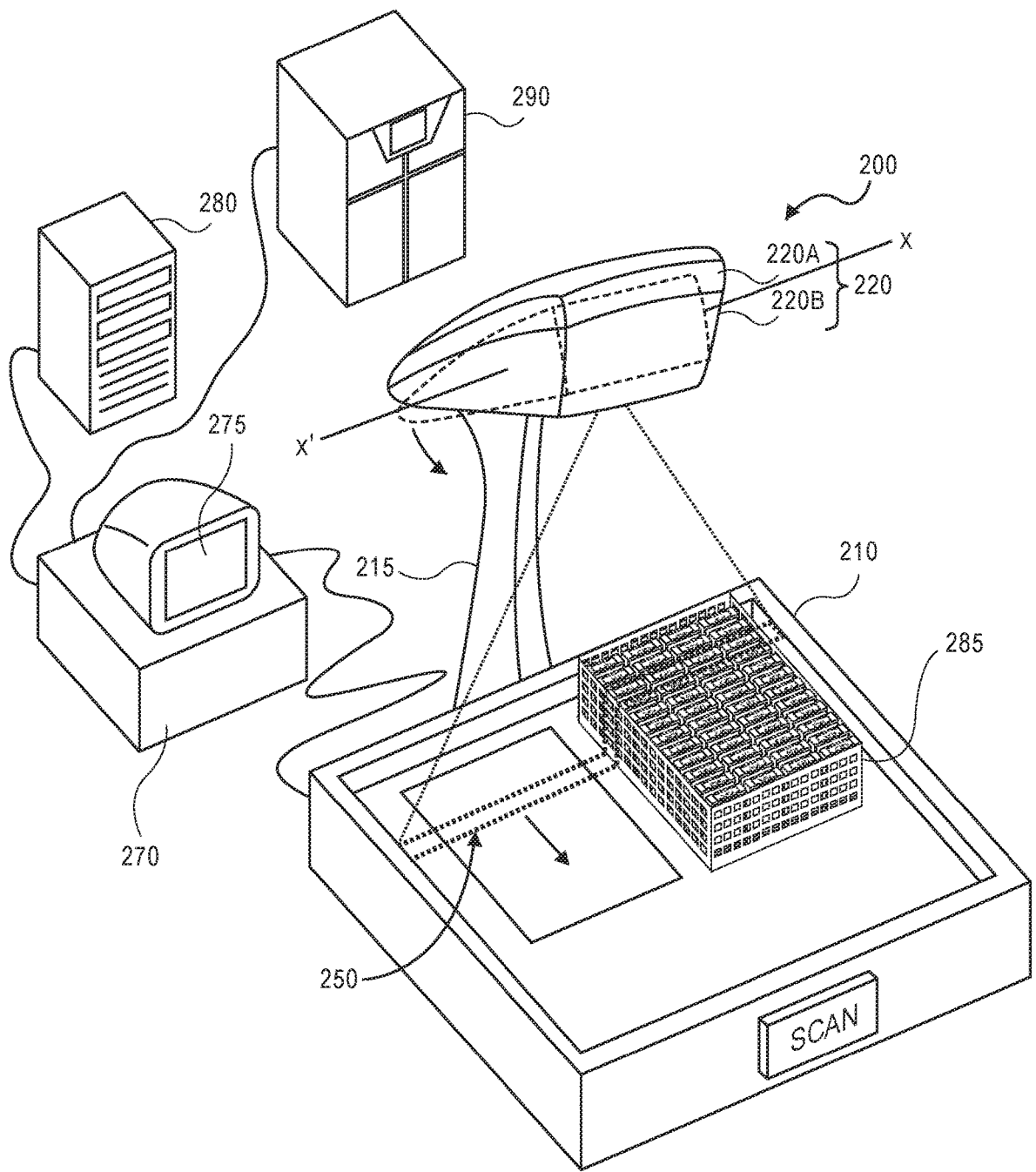
FIG. 5 shows the device of FIG. 4 showing the scanning of four identification information on cassettes in four magazines in a container placed in a recess in a base of the device.

FIG. 5 shows the device of FIG. 4 including container 280 containing a fixative and four magazines filled with cassettes disposed in recess 218 of base 210 of the device. Each magazine in container 280 may contain tissue samples intended for different tissue processing protocols. In other words, one magazine in container 280 may contain cassettes intended to be processed according to a first tissue processing protocol and a second magazine containing cassettes intended to be processed according to a second tissue processing protocol. It is appreciated that another container may be placed, representatively in the second recess 218 and both containers scanned simultaneously. FIG. 5 shows a scanning operation of device 200. One device 200 is activated (via an on/off switch), a technician may push a "scan" button on the device or initiate a scan through processor 270. In this embodiment, in a scan operation, portion 220B of lid 220 rotates about axis x-x' to allow light source 225 and lens 230 to advance row by row of cassettes from one side of base 210 to an opposite side. In this manner, device 200 scans/captures an image of identifiers on four cassettes at a time (one cassette in each of four magazines arranged side by side). FIG. 5 shows beam 250 across base 210 indicative of a scan. The rotation of lid 220 about axis x-x$^1$ allows beam 250 to advance on a surface of base 210 from one side of the base 210 closest to support 215 to an opposite side. In one embodiment, device 200 scans an image of the identifiers and saves the image into a database within the device. When all rows of cassettes are scanned, a processor associated with device 200 constructs a single image of all the cassettes showing their respective identifiers. The image is then converted into an electronic information (signals) and then provided, in one embodiment, to processor 270. Processor 270 contains non-transitory program instructions to receive the electronic information and confirm that the electronic information is indicative of identifier information for each cassette in the container. An image of all the identifiers, in one embodiment, is optionally displayed on display 275. In an embodiment where a scan is unable to capture an identifier on a cassette, the program instructions associated with processor 270 are operable to alert a technician through, for example, an alert on display 275. Such an alert allows a technician to scan the missing identifier manually or enter the identifier manually into processor 270.

The imaging device and systems described allows the sensing (e.g., imaging) of identifiers barcodes of individual cassettes assembled together with other cassettes without removing a cassette from other cassettes in a magazine or basket. Also, the cassette may be disposed in a liquid such as a fixative at the time of barcode sensing.

EXAMPLES

Example 1 is an apparatus to identify an identifier on a tissue cassette in an assembly of a plurality of tissue cassettes including a light source operable to illuminate a plurality of tissue cassettes; a sensor operable to capture an identifier on an individual tissue cassette or an image of the plurality of tissue cassettes in the assembly; and where the sensor is operable to capture reflected light from the light source of an image of the plurality of tissue cassettes, a converter to convert image data into an electronic signal.

Example 2 is the apparatus of Example 1, wherein the apparatus includes a base including an orientation designation for a container operable to contain the assembly of the plurality of cassettes; and a lid coupled to the base, the lid including the light source and the sensor.

Example 3 is the apparatus of Example 2, wherein the lid is hingedly coupled to the base, the coupling providing a first position wherein the lid is disposed over the base and a second position wherein a top portion of the base is exposed.

Example 4 is the apparatus of Example 2, wherein the sensor comprises a barcode reader.

Example 5 is the apparatus of Example 4, wherein the sensor includes a first sensor and the apparatus further includes a second sensor operable to capture a three dimensional image.

Example 6 is the apparatus of Example 3, wherein the sensor is operable to be moved in two dimensions within the volume of the lid over an area of the base.

Example 7 is the apparatus of Example 2, wherein the base includes at least one recess formed therein, the at least one recess including dimensions to contain a container in the base at the orientation designation, wherein the container is operable to contain the assembly of the plurality of tissue cassettes.

Example 8 is the apparatus of Example 7, wherein the at least one recess includes at least two recesses.

Example 9 is the apparatus of Example 8, wherein one of the at least two recesses is operable to contain a first container having first dimensions and the other of the at least two recesses is operable to contain a second container having second dimensions different than the first dimensions.

Example 10 is the apparatus of Example 1, wherein the sensor is operable to sense an image of the plurality of tissue cassettes in the assembly.

Example 11 is the apparatus of Example 2, wherein the lid includes a first side through which the sensor has access therethrough to a content of the base when the lid is disposed over the base and a second opposite side the includes a display.

Example 12 is the apparatus of Example 11, wherein the display allows interaction between a user and the apparatus.

Example 13 is the apparatus of Example 11, wherein the apparatus includes at least one of the following modes of operation associated with the sensing of reflected light corresponding to an identifier or a three dimensional image:

save the captured light in electronic form or save the captured image in a database within the apparatus;

send the captured light or captured image to an exterior system;

request processing protocol information from an exterior system and analyze whether there is any inconsistency between the information associated with the captured light or captured image and the processing protocol; or identify a color of the individual cassette and analyze whether there is any inconsistency between the information associated with the identifier read or captured and a processing protocol defined by a color of the individual cassette.

Example 14 is a system including an apparatus to identify an identifier on an individual tissue cassette in an assembly of a plurality of tissue cassettes; and a processor connected to the apparatus, the processor including non-transitory program instructions operable i) to obtain electronic information of the identifier;
ii to compare that information to information previously entered or retrieved information about a desired tissue processing protocol; and
iii) to report the comparison.

Example 15 is the system of Example 14, wherein the retrieved information includes information from a referenced identifier in the assembly.

Example 16 is the system of Example 14, wherein the retrieved information includes information regarding a color of a tissue cassette.

Example 17 is a method including: sensing identifiers on tissue cassettes each containing a tissue sample in an assembly including a plurality of tissue cassettes; and determining or verifying a tissue processing protocol of a tissue sample based on the sensed identifier.

Example 18 is the method of Example 17, wherein sensing includes capturing an image of a plurality of tissue cassettes in the assembly.

Example 19 is the method of Example 17, wherein sensing includes capturing reflected light corresponding to an identifier on an individual tissue cassette in the assembly.

Example 20 is the method of Example 17, wherein determining or verifying a tissue processing protocol is based on a reference in the assembly.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus to identify an identifier on a tissue cassette in an assembly of a plurality of tissue cassettes comprising:

a light source operable to illuminate a plurality of tissue cassettes in an assembly of a plurality of tissue cassettes, the assembly comprising sidewalls and a base that define a volume and an exposed top surface, the assembly capable of containing a plurality of tissue cassettes together in an upright position so that a front sidewall of each of the plurality of tissue cassettes faces outward from the top surface of the assembly;

a base defining an assembly area operable to contain the assembly of a plurality of tissue cassettes;

a sensor positioned above the base and over the assembly area, the sensor operable to automatically capture an identifier on a front sidewall of an individual tissue cassette by scanning and/or imaging the identifier or an image of the plurality of tissue cassettes in the assembly, wherein the sensor is moveable to allow a capture and read of an identifier by the sensor on a tissue cassette positioned at a first location in the assembly area by the sensor in a first location or a capture and read of an identifier on a tissue cassette positioned at a different second location in the assembly area by the sensor in a second location, and wherein the sensor is operable to capture reflected light from the light source of an image of the plurality of tissue cassettes, a converter to convert image data into an electronic signal; and a processor comprising non-transitory program instructions to:

direct a rotational movement of the sensor about an axis;

direct the sensor to scan a defined portion of the assembly area selected by a user and capture and read an identifier on a tissue cassette positioned anywhere in the defined portion of the assembly area and, where there are a plurality of tissue cassettes in the defined portion of the assembly area, to capture and read an identifier on each of the plurality of tissue cassettes while each of the plurality of tissue cassettes are contained together in the assembly; and provide an alert when an identifier is unable to be captured or read by the sensor.

2. The apparatus of claim 1, wherein the base comprises an orientation designation for a container operable to contain the assembly of the plurality of cassettes and the apparatus further comprises:

a lid coupled to the base, the lid comprising the light source and the sensor.

3. The apparatus of claim 2, wherein the sensor comprises a barcode reader.

4. The apparatus of claim 3, wherein the sensor comprises a first sensor and the apparatus further comprises a second sensor operable to capture a three dimensional image.

5. The apparatus of claim 2, wherein the base comprises at least one recess formed therein, the at least one recess comprising dimensions to contain a container in the base at the orientation designation, wherein the container is operable to contain the assembly of the plurality of tissue cassettes.

6. The apparatus of claim 5, wherein the at least one recess comprises at least two recesses.

7. The apparatus of claim 6, wherein one of the at least two recesses is operable to contain a first container having first dimensions and the other of the at least two recesses is operable to contain a second container having second dimensions different than the first dimensions.

8. The apparatus of claim 1, wherein the sensor is operable to sense an image of the plurality of tissue cassettes in the assembly.

9. The apparatus of claim 1, wherein a mode of operating the apparatus consists of at least one of the following modes of operation:
   save the captured identifier in a database within the apparatus;
   send the captured identifier to an exterior system;
   request processing protocol information from an exterior system and analyze whether there is any inconsistency between the information associated with the captured identifier and the processing protocol; and
   identify a color of the individual tissue cassette and analyze whether there is any inconsistency between the information associated with the captured identifier and a processing protocol defined by a color of the individual tissue cassette.

10. The apparatus of claim 1, wherein the processor further comprises non-transitory program instructions operable to:
    i) obtain electronic information of the identified identifier on each of a plurality of individual tissue cassettes;
    ii) compare the obtained information to information previously entered or retrieved information about a desired tissue processing protocol; and
    iii) report the comparison.

11. The apparatus of claim 10, wherein the obtained information comprises information from an identifier on a reference cassette in the assembly.

12. The apparatus of claim 10, wherein the retrieved information comprises information regarding a color of a tissue cassette.

13. The apparatus of claim 1, wherein the assembly area is defined by two dimensions and the sensor is moveable in the two dimensions.

14. An apparatus to identify an identifier on a tissue cassette in an assembly of a plurality of tissue cassettes comprising:

a light source operable to illuminate a plurality of tissue cassettes in an assembly of a plurality of tissue cassettes, the assembly comprising sidewalls and a base that define a volume and an exposed top surface, the assembly capable of containing a plurality of tissue cassettes together in an upright position so that a front sidewall of each of the plurality of tissue cassettes faces outward from the top surface of the assembly;

a base defining an assembly area operable to contain the assembly of a plurality of tissue cassettes;

a sensor positioned above the base operable to automatically capture an identifier on a front sidewall of an individual tissue cassette by scanning and/or imaging the identifier or an image of the plurality of tissue cassettes in the assembly,
      wherein the sensor is rotatable about an axis to allow a capture and read of an identifier on a tissue cassette positioned at a first location in the assembly area by the sensor in a first location or a capture and read of an identifier on a tissue cassette positioned at a different second location in the assembly area by the sensor in a second location, and
      wherein the sensor is operable to capture reflected light from the light source of an image of the plurality of tissue cassettes, a converter to convert image data into an electronic signal; and a processor comprising non-transitory program instructions to:
      direct a rotational movement of the sensor about an axis; and
      direct the sensor to capture and read an identifier on a tissue cassette positioned anywhere in the assembly area and, where there are a plurality of tissue cassettes in the assembly area, to capture and read an identifier on each of the plurality of tissue cassettes while each of the plurality of tissue cassettes are contained together in the assembly.

\* \* \* \* \*